(12) United States Patent
Shami

(10) Patent No.: US 9,443,214 B2
(45) Date of Patent: Sep. 13, 2016

(54) NEWS MINING FOR ENTERPRISE RESOURCE PLANNING

(71) Applicant: Mohammad Shami, Sunnyvale, CA (US)

(72) Inventor: Mohammad Shami, Sunnyvale, CA (US)

(73) Assignee: SAP SE, Walldorf (DE)

( * ) Notice: Subject to any disclaimer, the term of this patent is extended or adjusted under 35 U.S.C. 154(b) by 286 days.

(21) Appl. No.: 14/015,764

(22) Filed: Aug. 30, 2013

(65) Prior Publication Data

US 2015/0066567 A1    Mar. 5, 2015

(51) Int. Cl.
*G06F 17/30* (2006.01)
*G06Q 10/06* (2012.01)

(52) U.S. Cl.
CPC ............... *G06Q 10/06315* (2013.01)

(58) Field of Classification Search
CPC ................................ G06F 17/30598
USPC ....................................... 707/737
See application file for complete search history.

(56) References Cited

U.S. PATENT DOCUMENTS

| | | | |
|---|---|---|---|
| 2003/0110249 A1* | 6/2003 | Buus ...................... | G06Q 30/02 709/224 |
| 2010/0332404 A1* | 12/2010 | Valin .................. | G06Q 30/0239 705/310 |
| 2013/0238531 A1* | 9/2013 | Seidler .................... | G06N 5/042 706/12 |
| 2014/0012849 A1* | 1/2014 | Ulanov ............. | G06F 17/30707 707/737 |
| 2014/0075004 A1* | 3/2014 | Van Dusen ............. | H04L 41/04 709/223 |
| 2014/0201126 A1* | 7/2014 | Zadeh .................... | G06K 9/627 706/52 |

* cited by examiner

*Primary Examiner* — Baoquoc N To
(74) *Attorney, Agent, or Firm* — Brake Hughes Bellermann LLP

(57) ABSTRACT

A system may include a record generator to receive a plurality of documents associated with a plurality of suppliers and provide supplier-specific data records based thereon. The record generator may include an event classifier configured to execute a supplier-independent, event-based classification of each document, to thereby obtain event-classified documents. The record generator may include a supplier query generator configured to query the plurality of documents to obtain potential supplier matches from the plurality of suppliers, and a supplier match analyzer configured to analyze each potential supplier match of the potential supplier matches, to thereby obtain supplier matches. The record generator may include a supplier relevance analyzer configured to relate, for each event-classified document, any supplier identified therein to at least one event of the event-classified document, to thereby obtain supplier-event relationships. Thus, the record generator may provide supplier-specific data records, based on the supplier event relationship.

15 Claims, 8 Drawing Sheets

300

CompanyName 11223344    NegativeEvent CAPACITY/FACILITIES
                         302  306                        304              308

CAPACITY/FACILITIES  Alert  www.examplelink.com\210861 MachineName Example Machine Name
                                                                    312
                                                                         318
FRANCE: French truckers disrupt Shell fuel deliveries.   Http://www.examplesummary.com
9:40_1996-11-22    ...from the berre refinery run by Royal Dutch/<b>Shell</b> Shell refinery's oil
         France, a refinery spokesman said on.... One third of the<b>shell</b> Shell refinery's oil
         product output of 15,000-20,....one third of the shell<b>Shell</b>refinery's oil product
         output of 15,000-20,000....<b>Shell</b>refinery, one of four large plants grouped.... said
              <b>Shell</b>was trying to make sure petrol stations and...
                                                       326
  314                                           320
                                    322                         316
                          324

FIG.3

```xml
<?xml version="1.0" encoding="iso-8859-1"?>
<newsitem itemid="210861" id="root" date="_1996-11-22" xml:lang="en">
    <title> FRANCE: french truckers disrupt Shell fuel deliveries,</title>
    <headline>French truckers disrupt Shell fuel deliveries, </headline>
    <dateline>PARIS 1996-11-22</dateline>
    <text>
      <p> A blockade by french truckers is starting to hamper petrol and other
      fuel deliveries from the Berre refinery run by Royal Dutch/Shell in
      southern France, a refinery spokesman said on Friday,</p>
      <p>"All the loadings by truck have been halted,"he said,</p>
      <p>About one third of the Shell Shell refinery's oil product output of
      15,000-20,000 tonnes a day leaves the paint by road, he added.</p>
      <p>Production at the refinery was not affected, he said,</p>
      <p>Petrochemical deliveries, some of which depend entirely on road
      transport, had already been hit during an earlier stage of the strike, the
      spokesman said.</p>
      <p> The Shell refinery, one of four large plants grouped around Marseille,
      and which together make up the biggest Mediterranean refining center,
      appears to have been singled out because of its location near major road
      arteries, oil industry sources said.</p>
      <p>BP and Esso operate several refineries around Marseille. Other plants
         run by BP, Esso and Total appeared broadly unaffected, they said.</p>
      <p>Normally 100 chemical trucks and at least as many fuel trucks leave
         Shell's Berre plant every day, the spokesman said.</p>
      <p>He said Shell was trying to make sure petrol stations and industrial
         users of polymers and other petrochemicals got their deliveries on time
         by making arrangements with other companies.</p>
      <p>Industry officials in Paris said the strike appeared to have left several
         depots short of fuel, especially in southeastern and southwestern
         France.</p>
      <p>More depots were hit on Friday but it was hard to say how many were Involved, an UFIP industry
association official said.</p>
      <p>Prime Minister Alain Juppe called on Friday for a quick end to the
         strike after talks between truckers and haulage bosses broke down
         overnight.</p>
    </text>
    <copyright>© Reuters Limited 1996</copyright>
    <metadata>
      <codes class="bip:countries:1.0">
        <code code="FRA">
         <editdetail attribution="Reuters BIP Coding Group" action="confirmed" date="1996-11-22"/>
        </code>
      </codes>
      <codes class="bip:industries:1.0">
        <code code="_I13000">
         <editdetail attribution="Reuters BIP Coding Group" action="confirmed" date="_1996-11-22"/>
        </code>
        <code code="_I13300003">
```

FIG.6

Reuters id: 568029165 ←——— 702
Title : Worker's death leads to huge fines for guilty parties (news) ←——— 704
foundcode: c24x : CAPACITY/FACILITIES ←——— 706
foundcode: c24x : LABOUR ←——— 708
foundcode: GJ0BX : LABOUR ISSUES ←——— 710
foundcode: GCRIMX : CRIME, LAW ENFORCEMENT ←——— 712

---

Inner Query: ←——— 714
Company Query [ Raw Name : ""TATA STEEL UK LTD"", name : CompanyMention_110278249_0
, Org id : 110278249, TradeStyle id :0 ] ←——— 716
Evidence :  722
Lucene Document id : 0
Reuters Document id : 568029165 ←——— 718
720 ——→ Matches:
    … the part of Mr Norris' employer, vesuvius, and <b> Tata Steel UK </b> Ltd,
which then owned Tesside Cast Products, … 724
    … continue nonetheless
  Vesuvius UK Ltd and <b> Tata Steel UK </b> Ltd both pleaded guilty to breaching regulation… 726
    … 0, 000 and ordered to pay costs of £24,020, while <b> Tata
Steel UK</b>. Ltd was fined £120,000 and ordered to pay costs…
    … may have been prevented had Vesuvius UK Ltd and <b> Tata
Steel UK</b> Ltd made simple and adequate previsions to … 728
Match Quality Annotations :
maxLogDocumentFrequency --→ 24564
percentUpperCaseOfRawName --→ 66  730
allMatchesHappenAcrossLines --→ 0
numberOfCaseInitialWordsInRawName --→ 0
minPerOfCaseInNameMatch --→ 53
maxLenthOfNameMatch --→ 13
lenthOfRawName --→ 21
percentLowerCaseOfRawName --→ 0
numberOfMatches --→ 4
minLogDocumentFrequency --→ 24564
totalNumberOfDocuments --→ 13000
minPercentUpperCaseInNameMatch --→ 30
lengthOfArticle --→ 286
adjustedMaxLogDocumentFrequency --→ -11496
maxPercentUpperCaseInNameMatch --→ 30
maxNumberOfWordsInNameMatch --→ 3
minlengthOfNameMatch --→ 13
maxPercentLowerCaseInNameMatch --→ 53
adjustedMinLogDocumentFrequency --→ -11496
minNumberOfWordsInNameMatch --→ 3
minNumberOfCaseInitialWordsInRawName --→ 2
maxNumberOfCaseInitialWordsInRawName --→ 2
reviewerOutcome --→ UNKNOWN
Match Quality classification Outcome : GOOD_ALERT
Relevance Annotations :  732
totalCenterMatchWeights --→ 129
totalNumberOfUniqueBySurfaceOnlyOrganizationExtractions --→ 8
totalNumberOfOrganizationMatchesInTAAnotations --→ 8
numberOfMatches --→ 4
totalNumberOfMatchesAcrossFoundConpanies --→ 8
lengthOfArticle --→ 286
Relevance Classification Outcome : GOOD_ALERT, ""TATA STEEL UK LTD"", worker's death
leads to huge fines for guilty parties (news)

FIG.7 ←——— 734

| Supplier | At least Type | Date | Description |
|---|---|---|---|
| Company A | KPI: Delivery | | |
| | | | |
| | | | |

800

802 804 806 808

Av Lead Time (Days)

900

902

NEWS MINING FOR ENTERPRISE RESOURCE PLANNING

TECHNICAL FIELD

This description relates to enterprise resource planning software.

BACKGROUND

Many businesses have a large number of business partners and associated business relationships. These business relationships may be complex and diverse, and may be affected by a large number of potentially interrelated circumstances.

Consequently, many types of disruptions may occur in the context of such business relationships, and such disruptions may have numerous and far-reaching consequences. For example, a manufacturing business may find that a disruption experienced by a supplier in its supply chain results in significant delays of one or more manufacturing processes. Such delays, in turn, may result in lost profits and/or reduced customer satisfaction for the manufacturing business.

However, particularly for businesses having large numbers of the type of complex, diverse business relationships referenced above, it may be difficult to maintain an awareness of such disruptions, or potential disruptions. As a result, businesses may lack awareness of past and current circumstances of its business partners, thereby making it difficult to make informed decisions with respect to the associated business relationships.

SUMMARY

According to one general aspect, a system may include instructions recorded on a non-transitory computer-readable medium, and executable by at least one processor. The system may include a record generator configured to cause the at least one processor to receive a plurality of documents associated with a plurality of suppliers, and the record generator may include an event classifier configured to execute a supplier-independent, event-based classification of each document, to thereby obtain event-classified documents, and a supplier query generator configured to query the plurality of documents to obtain potential supplier matches from the plurality of suppliers. The record generator may include a supplier match analyzer configured to analyze each potential supplier match of the potential supplier matches, to thereby obtain supplier matches, and a supplier relevance analyzer configured to relate, for each event-classified document, any supplier identified therein to at least one event of the event-classified document, to thereby obtain supplier-event relationships. The record generator may be further configured to cause the at least one processor to provide supplier-specific data records, based on the supplier event relationship.

According to another general aspect, a computer-implemented method for executing instructions stored on a computer readable storage medium may include receiving a plurality of documents associated with a plurality of suppliers, executing a supplier-independent, event-based classification of each document, to thereby obtain event-classified documents, and querying the plurality of documents to obtain potential supplier matches from the plurality of suppliers. The method may include analyzing each potential supplier match of the potential supplier matches, to thereby obtain supplier matches, relating, for each event-classified document, any supplier identified therein to at least one event of the event-classified document, to thereby obtain supplier-event relationships, and providing supplier-specific data records, based on the supplier event relationship.

According to another general aspect, a computer program product tangibly embodied on a non-transitory computer-readable storage medium may include instructions that, when executed by at least one processor, are configured to receive a plurality of documents associated with a plurality of suppliers, execute a supplier-independent, event-based classification of each document, to thereby obtain event-classified documents, and query the plurality of documents to obtain potential supplier matches from the plurality of suppliers. The instructions, when executed, may be further configured to cause the at least one processor to analyze each potential supplier match of the potential supplier matches, to thereby obtain supplier matches, relate, for each event-classified document, any supplier identified therein to at least one event of the event-classified document, to thereby obtain supplier-event relationships, and provide supplier-specific data records, based on the supplier event relationship.

The details of one or more implementations are set forth in the accompanying drawings and the description below. Other features will be apparent from the description and drawings, and from the claims.

BRIEF DESCRIPTION OF THE DRAWINGS

FIG. 3 is an example data record used in the system of FIG. 1.

FIG. 6 is an example of a news article that may be utilized by the system of FIG. 1.

FIG. 7 is an example of an article processed by the system of FIG. 1.

DETAILED DESCRIPTION

Figure 1:
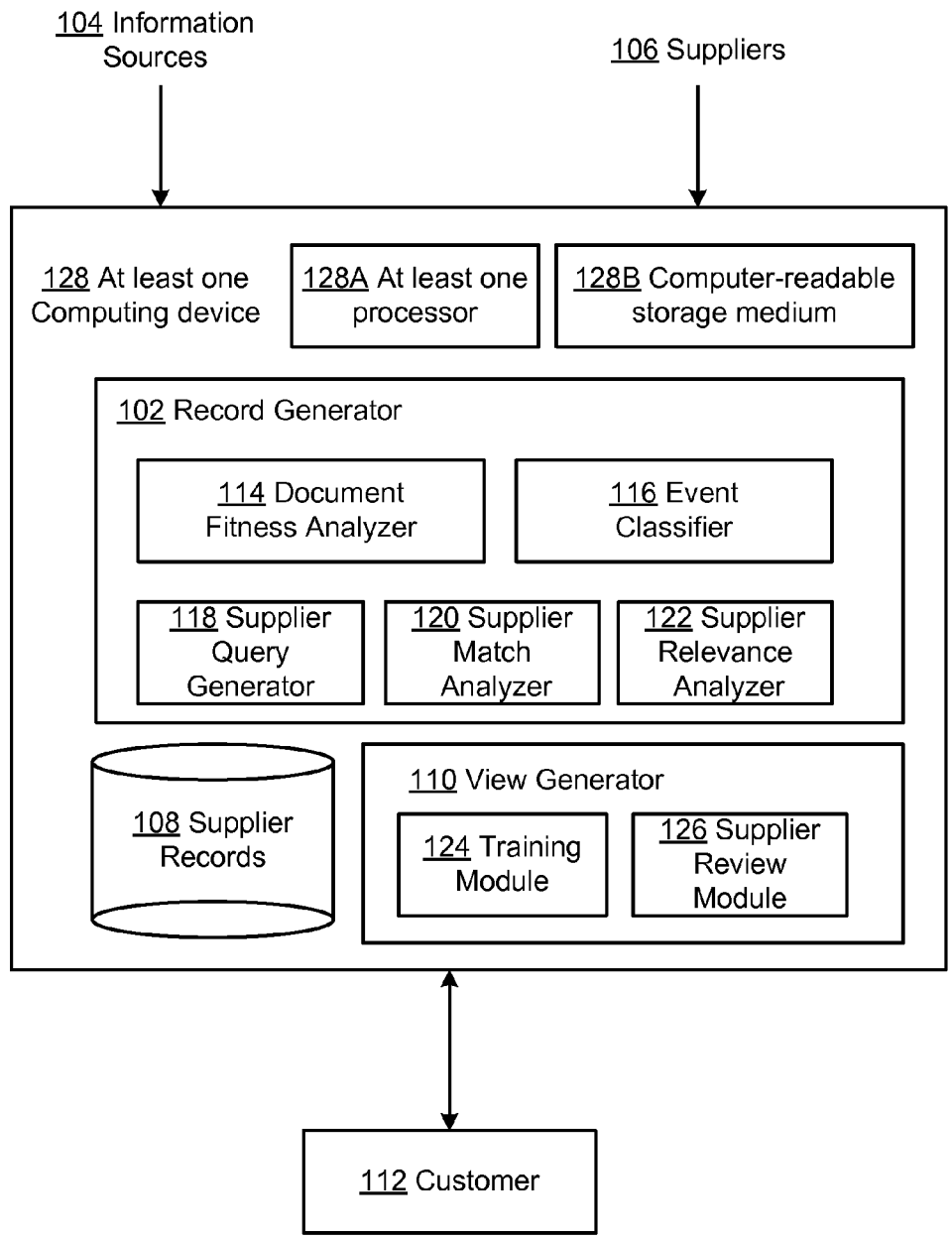
FIG. 1 is a block diagram of a system for news mining for enterprise resource planning.

FIG. 1 is a block diagram of a system 100 for performing news mining for enterprise resource planning. In the example of FIG. 1, a record generator 102 utilizes a plurality of information sources 104 to determine relevant information regarding a plurality of suppliers 106. The record generator 102 may thus populate a database of supplier data records 108. Due to the resulting structured storage format of the supplier records 108, a view generator 110 may be enabled to provide a customer 112 with information regarding the suppliers 106. In this way, the customer 112 may be provided with accurate, relevant, complete, and timely information regarding some or all of the suppliers 106, so that, as a result, the customer 112 is provided, in a convenient manner, with the ability to make informed business decisions.

As described in detail below, the record generator 102 may be configured to process very large volumes of documents from the information sources 104, even when such documents are unstructured, or structured in a highly heterogeneous fashion with respect to one another. In particular, the record generator 102 may be configured to implement various types of supervised machine-learning, which provides for the type of fast, accurate, complete results referenced above, with a minimum of requirements for detailed and/or expert human involvement on the part of the customer 112 or other user. Moreover, as also described below, the record generator 102 in such example implementations provides for dynamic, adaptive processing of documents received from the information sources 104, so that the supplier records 108 are provided in a manner which, over time, is highly likely to reflect the needs and desires of the customer 112.

The information sources 104, as just referenced, may represent a large and diverse collection of information sources. For example, the information sources 104 may include traditional news outlets, such as newspapers, magazines, journals, or other periodicals. More generally, the information sources 104 may represent virtually any source of information that is accessible by way of a connected computer network, such as, e.g., the public internet. Thus, for example, the information sources 104 may include a company website, a personal blog, a bulletin board or Twitter account, other social media channels, or virtually any accessible website.

With the above description of the information sources 104, which should be understood to be representative, non-limiting, and non-exhaustive, it may be appreciated that documents received from the information sources 104 may include virtually any discrete quantity of information obtained from one or more of the information sources 104. Thus, such documents may include, e.g., traditional news articles, company press releases, blog entries, Tweets, bulletin board postings, or virtually any other current or future type of communication item that may be network-accessible.

As just referenced, the information sources 104, and thus the various types of documents obtained therefrom, may vary greatly. Consequently, it may be appreciated that the various techniques utilized by the record generator 102 in obtaining such documents from the information sources 104 may vary greatly, as well. For example, the record generator 102 may obtain documents from the information sources 104 by subscribing to various news channels. In other examples, the record generator 102 may actively crawl specifically-identified websites in order to obtain information therefrom. The record generator 102 also may execute, or may cause to be executed, searches of specifically-identified websites or databases that have been identified as potentially including relevant or desired information. Thus, other known or future example techniques for collecting documents from the various information sources 104 would be apparent, and are therefore not discussed here in greatly detail, except as may be necessary or helpful in understanding operations of the system 100 of FIG. 1.

In operation, as referenced above, the record generator 102 is thus configured to utilize any such appropriate technique to collect documents which may be relevant to the suppliers 106. In this regard, it may be appreciated that the suppliers 106 may represent virtually any company or other entity which contributes to, or is otherwise relied upon, or potentially relied upon, by the customer 112. Thus, for example, the suppliers 106 may represent producers of goods and/or services which are consumed by the customer 112 as part of efforts of the customer 112 to provide one or more products for sale which are aggregated, manufactured, or otherwise produced using the goods/services of the suppliers 106.

In specific implementations described herein for the sake of example, the suppliers 106 may be referred to as providing physical goods which are shipped to one or more locations associated with the customer 112, for manufacture or assembly thereof into a physical product to be sold by the customer 112. However, as just referenced, the suppliers 106 should be understood in the general context of any entity which provides one or more goods or services to the customer 112, and which the customer 112 relies upon for successful operation of associated business (or other) activities.

Thus, the customer 112 should be understood to represent virtually any entity, or individual representative, employee, or agent thereof, which relies upon the suppliers 106 for successful completion of associated activities. Thus, for example, the customer 112 may represent a business which purchases, and receives shipment of, various physical goods from the suppliers 106. In more specific examples, the customer 112 may represent an individual acting on behalf of such an entity, who is responsible for monitoring activities of the suppliers 106 which might negatively or positively impact related operations for which such an individual is responsible.

In practice, the customer 112 may be responsible for monitoring and evaluating a large number of the suppliers 106. Moreover, it may be appreciated that one or more the suppliers 106 may also rely upon suppliers of its own for successful production of goods and/or services to be consumed by the customer 112 (e.g., the suppliers 106 may represent, or be associated with a multi-tiered network of suppliers). In the system 100, the customer 112 is nonetheless provided with an ability to effectively monitor the suppliers 106, as well as events which might impact relevant operations of the suppliers 106, so that the customer 112 may make informed decisions regarding current and future interactions with the suppliers 106.

Specific examples of techniques used by the customer 112 in evaluating the suppliers 106 are provided below with respect to the continuing description of the system 100 of FIG. 1, as well as, e.g., with respect to FIGS. 8 and 9. However, generally speaking, and as referenced above, the record generator 102 enables such informed decision-making by the customer 112 with respect to the suppliers 106, by, e.g., intelligently identifying potentially relevant information concerning individual ones of the suppliers 106, and thereafter creating the supplier records 108 in a manner which facilitates utilization thereof by the customer 112, by way of the view generator 110.

Thus, the record generator 102 is configured to utilize a large number of various types of documents from the various information sources 104, to thereby create the supplier records 108 with respect to individual ones of the suppliers 106. In the example of FIG. 1, the record generator 102 is illustrated as including various modules 114-122 that may be used to perform related functions.

For example, the record generator 102 is illustrated as including a document fitness analyzer 114. The document fitness analyzer 114 may be configured to perform an initial analysis of individual documents obtained from the information sources 104. For example, the document fitness analyzer 114 may analyze individual documents based on internal characteristics thereof, in order to determine whether each document falls above or below a threshold for determining whether to retain the document for further processing.

For example, as described in detail below with respect to FIGS. 4 and 5, the document fitness analyzer 114 may implement a supervised machine-learning (SML) algorithm to determine whether to omit or retain a particular document. For example, such a machine-learning algorithm may rely on features of documents such as, e.g., a length of the document, a number of companies (i.e., potential suppliers) included, text analysis (also referred to as, or similar so, Natural Language Processing, or linguistic analysis), and various other potential document features. In this way, the document fitness analyzer 114 may quickly remove individual documents which are unlikely to contribute meaningfully to population of the supplier records 108.

After such processing by the document fitness analyzer 114, an event classifier 116 may be configured to analyze remaining documents, to thereby label each individual document in accordance with one or more of a number of predetermined event types. In this regard, it may be appreciated that such events refer to virtually any event which may impact an ability of one of the suppliers 106 to fulfill its current or future obligations to the customer 112. By way of example, such events may include natural disasters, government regulations, shipping company strikes, and various other types of events which may be considered likely to affect multiple companies (including at least one of the suppliers 106) within a particular geographical region and/or within a particular industry. Other types of events may be more specific to individual ones of the suppliers 106, such as, for example, product recalls, present or threatened litigation, purchase or sale of a supplier (or of a division or subsidiary thereof), change in management, or many other types of events which would be apparent, some of which are mentioned below for the sake of further example.

The events may be classified according to a predetermined event model. For example, such an event model may classify various types of events as positive, negative, or indeterminate. A model may classify events according to a classification scheme in which events may have related or subtypes of events (for example, a natural disaster event may have sub-events of flood, tornado, hurricane, or earthquake).

As referenced above with respect to the document fitness analyzer 114, the event classifier 116 may be implemented using a supervised machine-learning algorithm, as described in detail below with respect to FIGS. 4 and 5. Accordingly, the event classifier 116 may quickly, efficiently, and accurately, and in a dynamic and adaptive manner, classify each document received from the document fitness analyzer 114, to thereby provide one or more labels to each such document, in accordance with the predetermined event model.

Subsequently, a supplier query generator 118 may receive each such labeled, classified document, and may thereafter query each such document to determine potential matches of terms contained therein with individual ones of the suppliers 106. For example, as described in detail below with respect to FIG. 2, the supplier query generator 118 may create a relaxed query for each supplier of the suppliers 106, and may thereafter apply each such query against each labeled document received from the event classifier 116. In this way, the supplier query generator 118 may obtain, for each labeled document, a number of potential supplier matches contained therein.

Thereafter, a supplier match analyzer 120 may be configured to analyze each such potential supplier match identified by the supplier query generator 118, to thereby determine a confidence level with respect to whether each such potential match actually corresponds to a reference to the identified supplier. For example, one of the suppliers 106 may be a company with the name "Eaton Inc." The supplier query generator 118 may return a potential match based on name of a Mr. Eaton. Subsequently, however, the supplier match analyzer 120 may determine that the potential match refers only to the name of an individual, who may or may not be associated with the company Eaton Inc., and may therefore determine that a confidence level in the potential match identified by the supplier query generator 118 is insufficient to retain the potential match as an actual supplier match.

As with the document fitness analyzer 114 and the event classifier 116, the supplier match analyzer 120 may utilize a supervised machine-learning algorithm to analyze the potential supplier matches received from the supplier query generator 118. More detailed description of example operations for the training and use of such a supervised machine-learning algorithm by the supply match analyzer 120 is provided below with respect to FIGS. 4 and 5. However, it may generally be appreciated that the use of such a supervised machine-learning algorithm enables the supplier match analyzer 120 to decide whether to retain or delete potential supplier matches in a fast, efficient, and accurate manner.

Thus, the supplier match analyzer 120 provides labeled, classified documents which include confirmed supplier matches to a supplier relevance analyzer 122. The supplier relevance analyzer 122 may be configured to determine an extent to which each matched supplier is relevant to one or more of the classified events. For example, the supplier match analyzer 120 may indicate a high confidence in an identified match referencing the company Eaton Inc., in the context of a document labeled as relating to events "hurricane" and "shipper strike." Thereafter, the supplier relevance analyzer 122 may analyze a document and determine whether the identified supplier Eaton Inc. is actually described within the document as being positively or negatively impacted by the related, labeled events.

For example, it may occur that the company Eaton Inc. is identified as being in the path of a hurricane, or, conversely, the company Eaton Inc. could be mentioned as being located outside the path of a hurricane and thereby in an advantageous position relative to other companies in the hurricane's path. Similarly, it is possible that the company Eaton Inc. could be identified within a particular document as being affected positively, negatively, or neutrally by a shipper strike.

Upon completion of operations of the supplier relevance analyzer 122, the record generator 102 may proceed to populate the supplier records 108. An example of a supplier record is provided below with respect to FIG. 3. As described in more detail in the context of FIG. 3, the supplier records 108 thus contain individual records which provide specific types of useful information with respect to individual suppliers, in a manner which enables the customer 112 to evaluate individual suppliers both individually and with respect to one another.

As with the document fitness analyzer 114, the event classifier 116, and the supplier match analyzer 120, the supplier relevance analyzer 122 may be implemented using a supervised machine-learning algorithm. Again, such details are described below, e.g., with respect to FIGS. 4 and 5. As referenced above, the use of such supervised machine-learning algorithms enables the supplier relevance analyzer 122 to perform its intended functionality in a timely, efficient, and accurate manner.

Moreover, as also described in more detail below, the various supervised machine-learning algorithms utilized by the modules 114, 116, 120, 122 may be selected, trained, and utilized independently of one another. In this way, an overall quantity of resources consumed in training and utilizing the various modules 114, 116, 120,122 may be minimized, while nonetheless obtaining highly accurate and useful information stored within the supplier records 108.

In the example of FIG. 1, the view generator 110 is illustrated as including a training module 124 which may be used to execute the types of individual training and use of the various supervised machine-learning algorithms implemented by the record generator 102. The training module 124 allows for the input or other identification of example information to be provided for each supervised machine-learning algorithm. From such example information, each supervised machine-learning algorithm may gain the ability to make relevant, accurate predictions about how present/future information should be utilized. Again, techniques for utilizing the training module 124 are described in detail below, e.g., with respect to FIGS. 4 and 5. For purposes of FIG. 1, it may be appreciated that the view generator 110 may be configured to provide all necessary user interfaces and associated logic for interacting with the customer 112 for the purpose of executing at least a portion of such training.

The view generator 110 is also illustrated as including a supplier review module 126. As described and illustrated below, e.g., with respect to FIGS. 8 and 9, the supplier review module 126 enables the customer 112 to utilize the supplier records 108 in a highly intuitive and useful manner. For example, the supplier review module 126 may enable the customer 112 to review an individual supplier to determine whether recent, relevant events are likely to have an impact on a performance of that supplier. In other examples, the supplier review module 126 may enable the customer 112 to compare a performance of a specific supplier against one or more other suppliers within a relevant industry. In this way, for example, the customer 112 may evaluate each supplier in the context of all similar suppliers used by the customer 112, and/or against other suppliers who are being evaluated for potential future use by the customer 112.

In the example of FIG. 1, the record generator 102, the supplier records 108, and the view generator 110 are illustrated as being implemented using at least one computing device 128. As shown, the at least one computing device 128 may include or utilize at least one processor 128A and computer readable storage medium 128B. Thus, it may be appreciated that the record generator 102 and the view generator 110 may be implemented using the at least one processor 128A, based on instructions stored using the computer readable storage medium 128B. Meanwhile, the supplier records 108 also may be stored using the computer readable storage medium 128.

Of course, the at least one computing device 128 is intended merely to provide a high-level, representative, and non-limiting example for implementation of the system 100. For example, it may of course be appreciated that the at least one computing device 128A will include many components and features not specifically illustrated in the example of FIG. 1, such as various appropriate input/output devices, power sources, and network interfaces. Further, any individual component of FIG. 1 should be understood to potentially represent two or more such components. For example, multiple computing devices in communications with one another may be utilized to implement individual ones of the record generator 102 and the view generator 110, or components thereof. Similarly, a plurality of processors and/or computer readable storage media may be used, as appropriate.

Similarly, any individual module of the record generator 102 or the view generator 110 may be implemented using two or more sub-modules. Conversely, any two modules of the record generator 102 or the view generator 110 may be combined for implementation in a single module, as would be appropriate for particular implementations of the system 100.

Figure 2:
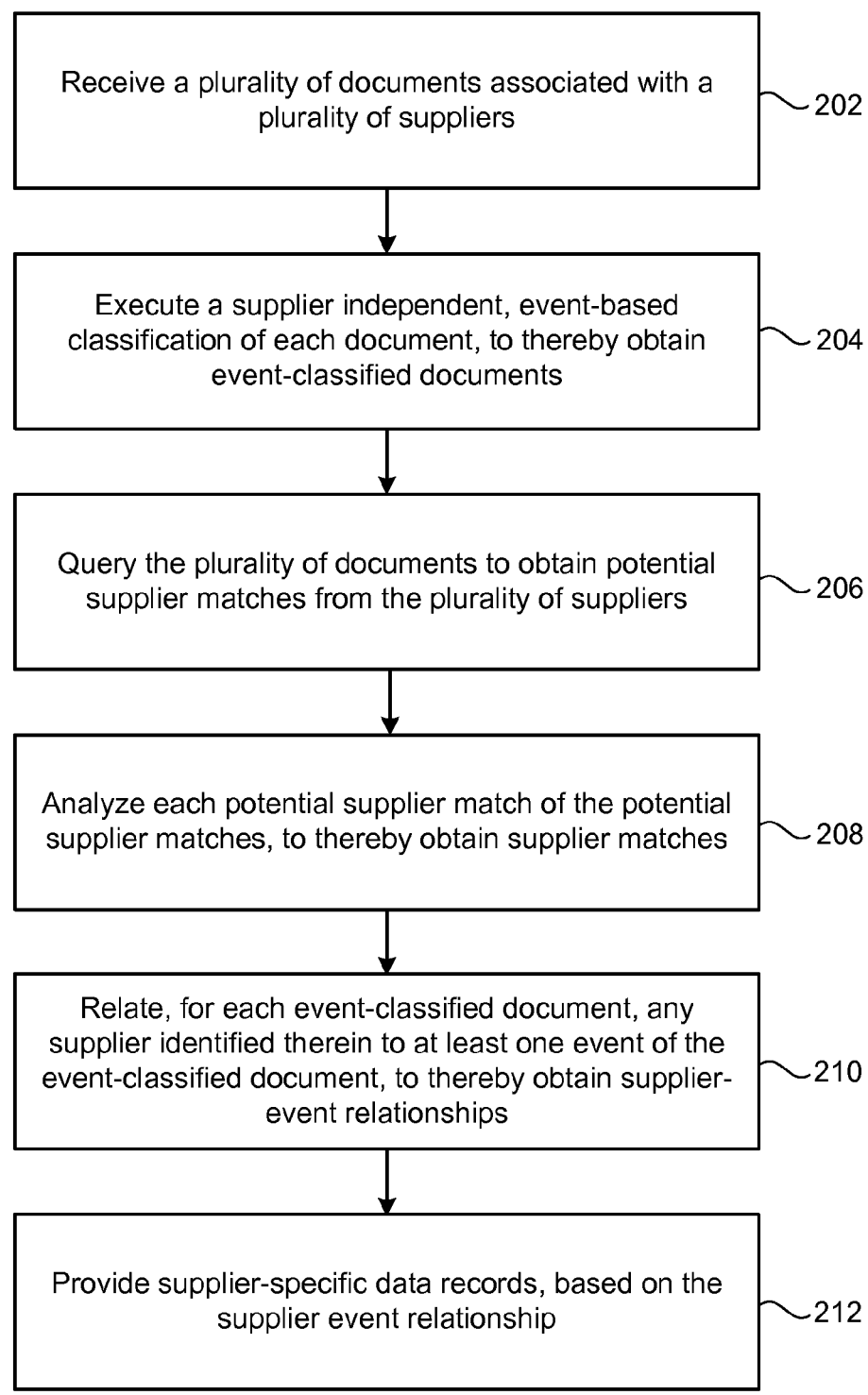
FIG. 2 is a flowchart illustrating example operations of the system of FIG. 1.

FIG. 2 is a flowchart 200 illustrating example operations of the system 100 of FIG. 1. In the example of FIG. 2, operations 202-212 are illustrated as separate, sequential operations. However, it may be appreciated that any two or more of the operations 202-212 may be implemented in a partially or completely overlapping or parallel manner, or in a nested, iterative, looped, or branched manner. Moreover, one or more additional or alternative operations may be included in some embodiments, while, in other example embodiments, one or more operations may be omitted.

In the example of FIG. 2, a plurality of documents associated with a plurality of suppliers may be received (202). For example, the record generator 102 may receive any of the various types of documents referenced above, or other types of documents, from one or more of the information sources 104, and regarding one or more of the suppliers 106 (where the term document is used here to include any and all of the various types of discrete communications items described above). For example, as referenced above, the document fitness analyzer 114 may receive the documents and may perform an initial assessment as to whether to retain or delete individual documents therefrom.

A supplier-independent, event-based classification of each document may be executed, to thereby obtain event-classified documents (204). For example, the event classifier 116 may evaluate each document received with respect to a predetermined event model. As referenced above, the classification of each document with respect to the event model is supplier-independent at least in the sense that the event model applies equally to each of the suppliers 106. Further, in example implementations such as the system 100 of FIG. 1, the event classifier 116 may perform its analysis of each document with respect to the event model at a time prior to affirmative identification of an individual supplier for which a given document being classified.

The plurality of documents may be queried to obtain potential supplier matches from the plurality of suppliers (206). For example, the supplier query generator 118 may create queries based on names of the suppliers 106, and then apply those queries against the event thus classified documents received from the event classifier 116. That is, in the example of FIG. 1, the supplier query generator 118 operates on event-classified documents received from the event classifier 116. However, in additional or alternative implementations, it may be possible for the supplier query generator 118 to query documents received from the document fitness analyzer 114 prior to, or parallel with, operations of the event classifier 116.

Each potential supplier match of the potential supplier matches may be analyzed, to thereby obtain supplier matches (208). For example, the supplier match analyzer 120 may analyze the potential supplier matches received from the supplier query generator 118 to determine whether each potential supplier match is, in fact, a desired, actual supplier match.

For example, as referenced above, the supplier query generator 118 may create a relaxed query for each supplier of the suppliers 106. Text analysis may be used, such as the Text Analysis product feature of SAP AG, which, e.g., extracts entities from documents using pre-defined dictionaries and entity types. Additionally, or alternatively, a Lucene SpanQuery may be used in the context of the Apache Lucene search engine, which is operable to find relative locations of query terms within a document, e.g., with respect to proximity to one another.

For example, a company, "Manufacturing Inc." may be queried using a query "Smith (manufacturing|MFG) (Inc|incorporated|etc)". In this way, the supplier query generator 118 captures potential supplier matches in a potentially overly-inclusive manner, whereupon the supplier match analyzer 120 may be configured to implement an appropriate supervised machine-learning algorithm, as referenced above and described in detail below, to identify actual, desired supplier matches from such potential supplier matches received from the supplier query generator 118.

For each event-classified document, any supplier identified therein may be related to at least one event of the event-classified document, to thereby obtain supplier-event relationships (210). For example, the supplier relevance analyzer 122 may implement an appropriate machine-learning algorithm to determine an extent to which a given document, and associated events thereof, are related to supplier matches identified within the document by the supplier match analyzer 120. For example, the supplier relevance analyzer 122 may implement such a supervised machine-learning algorithm which relies on a variety of features to determine an importance or relevance of a particular supplier match to a given document and associated events. For example, the supplier relevance analyzer 122 may consider whether a given supplier match is included early in an article, or in the title thereof. The supplier relevance analyzer 122 may consider an extent to which mentions of the supplier match are spread throughout a given document, and/or an extent to which other companies (e.g., other ones with the suppliers 106) are mentioned within the document. Thus, the supplier relevance analyzer 122 may determine an extent to which, if at all, a particular supplier match is related to a document, or to a specific event type associated therewith.

Supplier-specific data records may thus be provided, based on the supplier event relationship (212). For example, the record generator 102 may generate the supplier records 108, based on operations of the supplier relevance analyzer 122 in relating individual suppliers with corresponding individual documents and events referenced therein.

FIG. 3 is an example of a supplier data record 300 that may be included in the supplier records 108. More specifically, FIG. 3 represents an example supplier data record created with respect to an example article that is illustrated and described below with respect to FIG. 6. As described there, the article of FIG. 6 is a historical article that may be used for training purposes with respect to training one or more of the supervised machine-learning algorithms described herein. Nonetheless, for purposes of illustrating an example form and content of a supplier data record of the supplier records 108, the example of FIG. 3 may be considered representative.

Thus, in the example of FIG. 3, it is illustrated that the data record 300 includes a unique company name or identifier 302, which, in the example, identifies the company Royal Dutch Shell PLC. That is, generally speaking, such a unique identifier may be associated with an individual supplier of the suppliers 106, notwithstanding the fact that such a supplier may be associated with a potential plurality of names, name forms, abbreviations, or nicknames. In the example implementations, a single individual identifier may, in some cases, be associated with a given supplier and one or more divisions or subsidiaries thereof. In other examples, based on user choice, unique identifiers may be assigned uniquely to each identified division or subsidiary.

Further in the example of FIG. 3, a data item type 304 includes an item "capacity/facilities," illustrating that the data record 300 has been classified as a negative event related to a capacity of the company identified in item 302 to perform its desired function, as such capacity is related to available facilities of the identified supplier. Consequently, item 306 illustrates an alert that has been identified with respect to the capacity/facilities of the identified supplier, while an item 308 provides an example link to a source for the document represented by the supplier data record 300 (i.e., the article of FIG. 6).

Further in FIG. 3, a title 310 of the relevant article may be included, along with a link 312 to a summary thereof. A date/time 314 of the article may further be included, in conjunction with extracted portions 316 which include snippets of the underlying article which include individual mentions 318-326 of the identified company 302.

In this way, the data record 300 includes all relevant information for the underlying article in question, in a format which may easily be stored within the supplier records 108 for future analysis and use thereof. It may be appreciated that the various mentions 318-326 of the identified company 302 may include mentions of the identified company 302 which are not identical to one another, but which have been determined to refer to the same underlying supplier by operations of the supplier query generator 118 and the supplier match analyzer 120. In the example of FIG. 3, the individual mentions 318-326 are illustrated as being presented in bold type (i.e., are set off by appropriate markup tags for causing the related text to be provided in a bolded format). In this way, the customer 112 in reviewing the data record 302 may quickly identify individual mentions of the relevant supplier.

Figure 4:
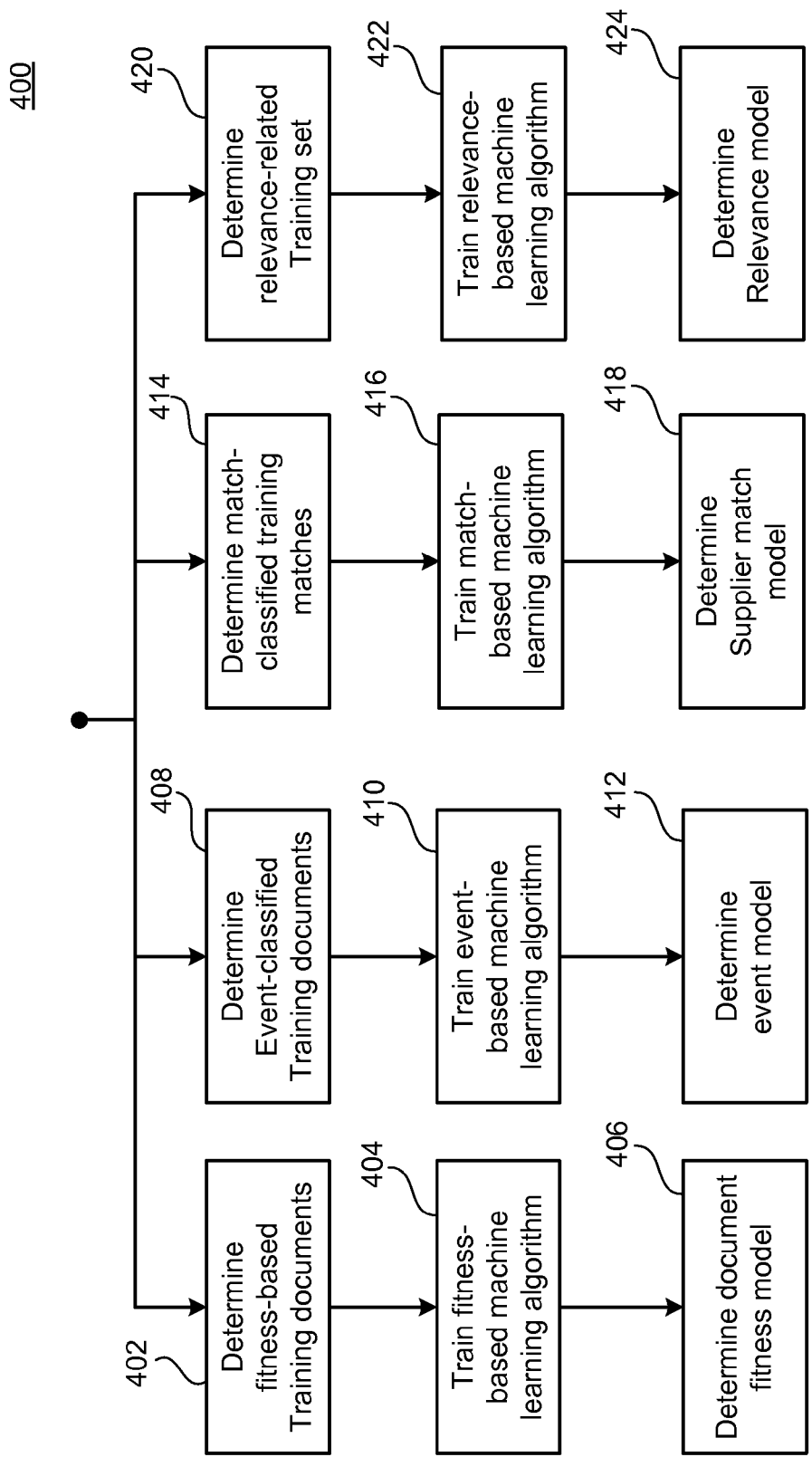
FIG. 4 is a flowchart illustrating independently-trained machine learning algorithms used in the system of FIG. 1.

FIG. 4 is a flowchart 400 illustrating example training techniques for training individual ones of the document fitness analyzer 114, the event classifier 116, the supplier match analyzer 120, and the supplier relevance analyzer 122. In the example of FIG. 4, for example, as referenced above and described in more detail below, the various parallel operations illustrate that training and implementation of the various supervised machine-learning algorithms may proceed substantially independently of one another. As a result, for example, each independent training operation may require a relatively small quantity of training examples, and the various training operations may be executed in a quick and efficient manner. Moreover, the resulting implementation of the system 100 of FIG. 1 provides a robust, reliable system for obtaining and utilizing the supplier records 108.

In the example of FIG. 4, and initially with respect to the document fitness analyzer 114, fitness-based training documents may be determined (402). In other words, a plurality of documents to be used in training the document fitness analyzer 114 may be identified, e.g., by the customer 112.

For example, initially, the customer 112 may provide a corpus of documents that are considered to be of the type that is usual and/or representative of documents that will ultimately be utilized by the supplier relevance analyzer 122. In additional or alternative example implementations, a search for such documents may be conducted, and the search results thereof may be utilized as the training documents. In subsequent operations, and as part of the constantly-updating, dynamic nature that is advantageously provided by the use of the various supervised machine-learning algorithms described herein, actual documents utilized by the supplier relevance analyzer 122 for updating the supplier records 108 may be determined by the document fitness analyzer 114 and used for updated training of the associated supervised machine-learning algorithm.

Subsequently, training of a fitness-based machine-learning algorithm may proceed (404). Techniques for executing such training are described in more detail below with respect to FIG. 5. However, it may be generally appreciated that such training may include identifying the various characteristics/features, and example values thereof, that may be used by a selected algorithm to evaluate the various training documents (e.g., using feedback from the customer 112 by way of the training module 124), and ultimately to evaluate documents received during operations of the document fitness analyzer 114.

It may be appreciated that the selection and training of the fitness-based machine-learning algorithm in the operation 404 may impact the determination of the fitness-based training documents in the operation 402. For example, generally speaking, a larger number of features/characteristics to be considered by the fitness-based machine-learning algorithm will require a larger number of documents to execute the training, in order to obtain reliable and useful results. For example, such characteristics/features may include a relative length of each document, a number of distinct companies mentioned in each document or source of the document, individual terms used in the document, individual characters used in the document, text analysis of the document, and various other additional or alternative features/characteristics. Moreover, as described in more detail below, the various types of supervised machine-learning algorithms that may be selected (e.g., the support vector machine (SVM) algorithm, or other algorithms, some of which are referenced below) also may have an impact on a number and type of training documents selected.

Once training is completed, a document fitness model may be determined (406) and stored for use by the document fitness analyzer 114. In this way, as referenced, the document fitness analyzer 114 may utilize the determined document fitness model to evaluate incoming documents from the various information sources 104.

Meanwhile, independent (e.g., parallel) training of the event classifier 116 may proceed. For example, as shown, event-classified training documents may be determined (408). In example implementations, the same or similar documents used as the fitness-based training documents may be used, at least in an initial iteration of training. In other examples, separate training documents may be utilized which are considered to be more effective in configuring operations of the event classifier 116. Nonetheless, it may be appreciated that the appropriate event-classified training documents may be determined in an automated fashion, and/or with an assistance of the customer 112.

Then, training of a selected event-based machine-learning algorithm may proceed (410). As referenced above, and described in more detail below with respect to FIG. 5, such training may include an identification of appropriate features, as well as specific values thereof within the event-classified training documents. As also referenced, the selection of the event-based machine-learning algorithm may be independent of the selected fitness-based machine-learning algorithm, so that a same or different algorithm may be used. Accordingly, an algorithm may be selected that is determined to be particularly useful for operations of the event classifier 116. Moreover, a nature and type of the training to be conducted accordingly (e.g., conducted at least in part using the training module 124) may impact the type and number of event-classified training documents selected in the operation 408. In practice, the training may utilize a predetermined taxonomy of event types, in conjunction with appropriate text analysis techniques (e.g., consideration of stemmed tokens and/or identified noun phrases). By way of further example, the selected algorithm may include, e.g., the SVM algorithm referenced above, or the radial basis function algorithm.

In this way, an event model may be determined (412) for use by the event classifier 116 in classifying documents received from the document fitness analyzer 114. Conceptually similar operations may be conducted for the supplier match analyzer 120. Specifically, as illustrated in the example of FIG. 4, match-classified training matches may be determined (414). That is, analogously to the determinations of the fitness-based training documents and the event-classified training documents, individual matches for company names of the suppliers 106 may be selected for purposes of training the supplier match analyzer 120. In the example implementations, the selected training matches may be determined using some or all of the fitness-based training documents and/or the event-classified training documents, and/or may be selected from other sources. Moreover, as discussed above with respect to the previously-described training documents, the selection of the match-classified training matches may occur in a manner which reflects the type and extent of subsequent training to be performed. For example, selection of the matched-classified training matches may relate to the types of features selected to be used during subsequent training.

Specifically, the training of a match-based machine-learning algorithm may proceed (416), based on a selection of an appropriate algorithm and on selection of appropriate/desired features. For example, such features may include a percentage of uppercase characters within a potential supplier match, a percentage of lowercase characters of potential supplier matches, a maximum length of a name of a potential supplier match, a minimum length of names of potential supplier matches, a minimum or maximum number of words and potential supplier name matches, and various other features, some of which are described in more detail below with respect to FIG. 7. By way of example, a selected algorithm for the match-based machine-learning algorithm of the supplier match analyzer 120 may include, e.g., the SVM algorithm (including, e.g., a polynomial function (e.g., a second-degree polynomial function), or a quadratic mapping). Again, a selection of an appropriate/desired algorithm, and associated training thereof, may proceed independently from corresponding selections and training conducted with respect to analogous operations in the context of the document fitness analyzer 114, the event classifier 116, and the supplier relevance analyzer 122.

In this way, a supplier match model may be determined (418), and may be applied by the supplier match analyzer 120 against potential matches received from the supplier query generator 118 with respect to individual documents. Further, the supplier match analyzer 120 may monitor operations of the customer 112 in utilizing provided supplier matches, so as to dynamically update the supplier match model over time.

Further in FIG. 4, and with reference to the supplier relevance analyzer 122, a relevance-related training set may be determined (420). For example, the same, similar, or overlapping set of training documents used by the document fitness analyzer 114 and the event classifier 116 may be utilized by the supplier relevance analyzer 122.

Subsequently, training of a selected relevant-based machine-learning algorithm (422) may proceed. Example features may include a total number of inclusions of individual suppliers, inclusion of individual suppliers at a beginning (or in a title) of a given document, and a total number of the suppliers 106 mentioned within a given document. In some implementations, the supplier relevance analyzer 122 may be intended to determine a relevance of an individual supplier match within the document, while, in other implementations, the supplier relevance analyzer 122 may specifically correlate individual supplier matches with individual events included in the same document.

Consequently, a relevance model may be determined (424). The supplier relevance analyzer 122 may thus supply the relevance model against event-classified documents from the event classifier 116 which have been analyzed by the supplier match analyzer 120 to identify actual supplier matches contained therein. As referenced above, the supplier relevance analyzer 122 may have access to actions of the customer 112 in evaluating results of the supplier relevance analyzer 122 in the context of reviewing or otherwise utilizing the supplier records 108. Consequently, the relevance model may be updated in a dynamic manner, so as to maintain or increase accuracy in operations thereof over time.

Figure 5:
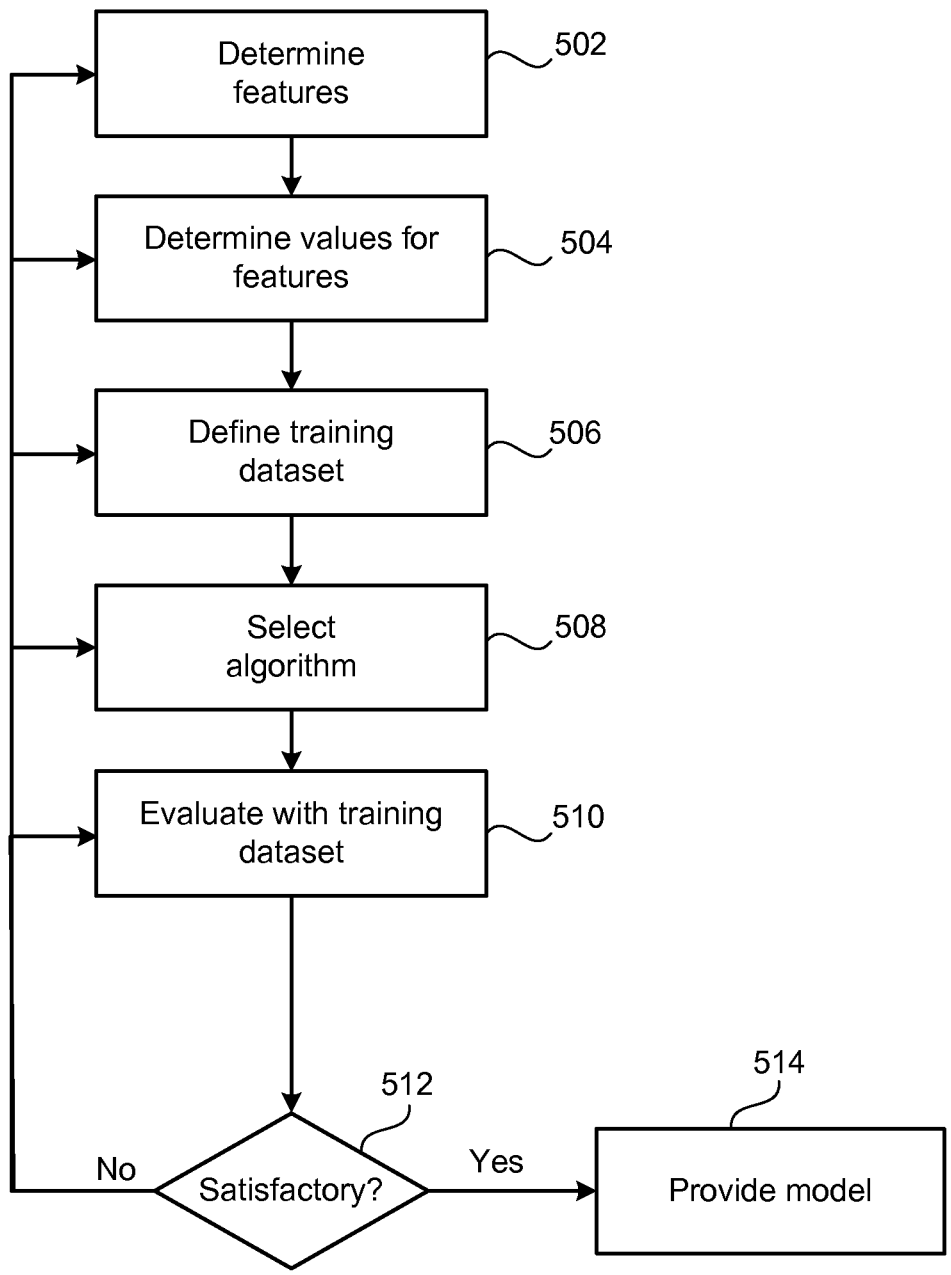
FIG. 5 is a flowchart illustrating example training techniques that may be used in the example of FIG. 4.

FIG. 5 is a flowchart 500 illustrating more detailed example operations of the various training operations described in FIG. 4 with respect to the document fitness analyzer 114, the event classifier 116, the supplier match analyzer 120, and the supplier relevance analyzer 122. That is, the operations 502-514 of FIG. 5 illustrate a general set of operations that may be used in executing training for the supervised machine-learning algorithms, which may be modified or utilized as needed to implement the various operations described above with respect to FIG. 4.

In the example of FIG. 5, features are initially determined (502). For example, a universe of possible features which may be utilized by a relevant one of the document fitness analyzer 114, the event classifier 116, the supplier match analyzer 120, or the supplier relevance analyzer 122 may be selected. Various examples of such features are provided above, or would be apparent in consideration of the described functions thereof.

Values for the features may then be determined (504). For example, the various training sets (e.g., training documents, or training matches) referred to above in the context of FIG. 4, and, specifically, in the context of the operations 402, 408, 414, 420, may be examined to determine corresponding values for the selected features. For example, in a simplified example, the training for the document fitness analyzer 114 may include selection of the feature of document length. Then, values for the various documents in the fitness-based training documents for the feature of document length may be determined. Similar values may be determined for the various features in the context of each separate, independent training operation.

A training dataset may then be defined (506) from within the universe of available features and corresponding values. For example, a defined subset of the available universe of features and corresponding values for each training operation may be selected. In this regard, it will be appreciated that the selected subset defined as the training dataset may be considered to have particular predictive value with respect to correctly classifying subsequently-received input.

Thus, the subset may be selected by the customer 112 based on an analysis or prediction of the customer 112 in this regard. Additionally, or alternatively, the training dataset may be selected based on feedback determined from previous uses of the same or different training dataset in conjunction with a specific supervised machine-learning algorithm.

To utilize a currently-defined training dataset, an appropriate supervised machine-learning algorithm may be selected (508). Several examples of such algorithms are referenced above. However, it may be appreciated that any appropriate current or future algorithm may be utilized. For example, single-layer or multi-layer perceptron techniques may be used, as well as their own networks, statistical learning algorithms (e.g., Bayesion networks), and/or instance-based learning. Any such algorithm, and, in some instances, combinations thereof, may be selected.

Subsequently, the selected algorithm may be evaluated with the previously-selected training dataset (510). That is, the evaluation will determine, for each training document or training match, whether the applied, selected algorithm results in a correct or useful prediction. For example, a training document used in training the event classifier 116 may be classified for training purposes as relating to an event "natural disaster." The evaluation of this training document for the feature "natural disaster," using the selected algorithm, may or may not result in a correct classification of the training document, i.e., may or may not result in the training document being correctly labeled with the label "natural disaster."

More generally, during the evaluation, it may occur that a false negative occurs in which a training document or training match that should be classified in a certain manner, is in fact failed to be classified as such. In such cases, the consumer 112 would hypothetically be incorrectly deprived of receiving a correctly-classified document or match. On the other hand, the evaluation may result in a false positive, in which a document or match is classified as being correct, when in fact, no such classification should have been determined. For example, in the example above with respect to the company Eaton Inc., it may occur that a training document includes the name Mr. Eaton, and that, in the context of a particular evaluation using a particular algorithm, a document containing the name Mr. Eaton is incorrectly referred to as including a positive supplier match for the company Eaton Inc. In these cases, the consumer 112 is potentially provided with faulty information which may be useless at best, or detrimental at worst.

Therefore, for these and other reasons, a determination as to whether the evaluation is satisfactory (512) may generally depend on a number of situation-specific factors. For example, in the example just given, if the customer 112 is in a situation in which false positives are not considered to be particularly damaging, then a prediction algorithm may be selected which is relatively more inclusive with respect to determining a presence or inclusion of relevant classifications. For example, in such cases, the document fitness analyzer 114 would be more likely to include a relatively large number of documents, the event classifier 116 would be more likely to include a relatively larger number of assigned event labels, the supplier match analyzer 120 would be marginally more likely to confirm potential supplier matches, and the supplier relevance analyzer 122 would be incrementally more likely to include a finding of relevance between a supplier match and a corresponding document/event label. Conversely, of course, different selected algorithms in each case, or different parameters therefor, may be selected to obtain the opposite result, i.e., relatively less inclusive classifications, such as in cases in which false positives are considered to be particularly damaging to a decision-making process of the customer 112.

As shown in FIG. 5, if the evaluated training set is considered not to be satisfactory (512), then any of the previous operations 502-510 may be revisited and adjusted. For example, different features and corresponding values may be selected (e.g., different training documents may be selected), and a modified training set may be selected therefrom. Of course, in separate iterations, different algorithms may be selected. Further, in the evaluations thereof, various parameters (e.g., a tolerance for false positives and/or false negatives, as referenced above) may be specified. Once an evaluation has been deemed satisfactory (512), the corresponding model may be provided (514), such as, e.g., the document fitness model, the event model, the supplier match model, or the relevance model.

FIG. 6 is an example document 600 that may be utilized as a training document, e.g., in the context of the document fitness analyzer 114, the event classifier 116, or the supplier relevance analyzer 122. That is, as described in detail above, the general operational flow of FIG. 5 may be applied in the context of each of the four independent training operations of FIG. 4. Thus, the training document 600 could be utilized separately in the determinations of the document fitness model, the event model, and/or the relevance model. Of course, individual supplier matches from within the training document 600 could also be used to assist in the development of the supplier match model, as well.

In the example of FIG. 6, the document 600 is an article obtained from the Reuters news service, and contains various data and metadata provided by Reuters when generating the content of the corresponding article. For example, a line 602 includes a specific news item ID that uniquely identifies the article, as well as a date of the article. A line 604 includes a title of the article, while line 606 includes a headline for the article. A line 608 includes a date line for the article. Texts of the article is included in a portion 610.

Further, metadata 612 includes a plurality of codes utilized by Reuters and leveraged by the system 100 to perform, in some example implementations, various functions described above. For example, the metadata 612 includes a class of codes in line 614 specifying codes related to countries, while a line 616 includes a specific code FRA identifying the country of France. A line 618 includes attribution information detailing a time and/or other characteristics of the coding referenced in line 614, 616.

Similarly, a line 616 identifies a different class of codes related to specific industries, while a line 619 identifies a specific code within that class "113000," which refers to a specific industry in the context of the corresponding Reuters code taxonomy. A line 620 includes attribution information for a coding of line 617, 619. A line 622 identifies a separate code "1130003," representing a separate specific industry within the class of codes identified in the line 617. It will be appreciated from the line 622, and from FIG. 6 in general, that many different codes may be applied to the text of the document 600.

As referenced above with respect to FIG. 3, the supplier record 300 may thus be generated from the training document 600. As shown, the supplier record 300 is stored using the unique company name 302 which is specific to the implementation of the system 100 with respect to the specific customer 112. That is, as described with respect to FIG. 3, the specific company name and unique ID 302 of FIG. 3 refers to the company Shell, so that the portion 316 of FIG. 3 identifies, in bold type, each instance of the textual name of the company identified in the unique ID 302.

Similarly, as also described with respect to FIG. 3, the event classification 304 in FIG. 3 represents the labeling of the supplier record 300 and associated document as being associated with the suppliers capacity and facilities in the context of the implementation of the system 100. It may be appreciated that such classification by the event classifier 116 may result from the associated training of the event classifier using the training document 600. The system-specific labeling of the event classifier 116 may or may not correspond partially to some or all of the various codes or code classes described above with respect to the document 600 of FIG. 6. Nonetheless, in the example, it will be appreciated that such codes and code classes of FIG. 6, in the context of various news sources or other sources included within the information sources 104, may be leveraged to obtain the system-specific classifications described above with respect to the system 100. Of course, in some cases, no such available classification for training documents may exist, in such cases, to the extent that existing classification schemes are not available to be leveraged, and the customer 112 may utilize the training module 124 to assign or identify appropriate classifications and associated values for an appropriate number of training documents.

FIG. 7 provides examples of various inputs and corresponding outputs for the event classifier 116, the supplier query generator 118, the supplier match analyzer 120, and the supplier relevance analyzer 122. As shown, FIG. 7 refers to an article having a specific Reuters ID shown in line 702, which is associated with a title identified in line 704.

As also shown, the underlying article has been classified by the event classifier 116 to include four separate event labels. Specifically, as shown, the first label for capacity/facilities is illustrated in a line 706, while the second label for labor is shown in a line 708. A third line 710 includes the label labor issues, while a fourth line 712 includes the labels crime, law enforcement. Thus, it may be appreciated that the various labels of lines 706-712 have been applied to the article identified in line 702, using the event model previously associated with the event classifier 116.

Further, a line 714 identifies a query that may be utilized by the supplier query generator 118 with respect to, in the example, a specific supplier of the suppliers 106 identified as TATA STEEL UK LTD. Therefore, a company query 716 is defined which specifies the name "TATA STEEL UK LTD," as well as various other known identifiers thereof, if available. As also shown, portion 718 relates the specific document in question to the query 716.

Then, matches 720, representing potential supplier matches identified by the company query 716, include illustrated matches 722, 724, 726, 728. Then, a portion 730 illustrates example match quality annotations that may be utilized by the supplier match analyzer 120 to evaluate the potential supplier matches 722-728. Meanwhile, a portion 732 illustrates a result of a match quality classification, using the match quality annotations 730.

As shown, and as referenced above, the match quality annotations 730 may include many different potential annotations. Of course, the various match quality annotations 730 are intended as illustrative, non-limiting examples. Similarly, the corresponding match quality classification outcome 732 are considered to be non-limiting examples, and included merely for the purpose of illustration and explanation.

Based on the match quality classification outcome 732, a relevance classification outcome 734 may be provided by the supplier relevance analyzer 122. As shown, the match quality classification outcome 732 identifies the classification of the supplier match for TATA STEEL UK LTD as representing a positive supplier match, and thus a good alert to the customer 112. Similarly, the relevance classification outcome 734 thus identifies a positive relevance of the supplier match for TATA STEEL UK LTD, as it relates to the article identified in the line 702, and with respect to the various event labels 706-712.

As a result of operations associated with FIG. 7, although not specifically illustrated, it may be appreciated that the record generator 102 may subsequently generate a corresponding supplier record to be included within the supplier records 108. As referenced, in this way, the supplier records 108 represent a large number of supplier-specific data records, which may be utilized by the system 100, e.g., by the supplier review module 126, to provide the customer 112 with timely, useful information regarding the suppliers 106.

Figures 8, 9:
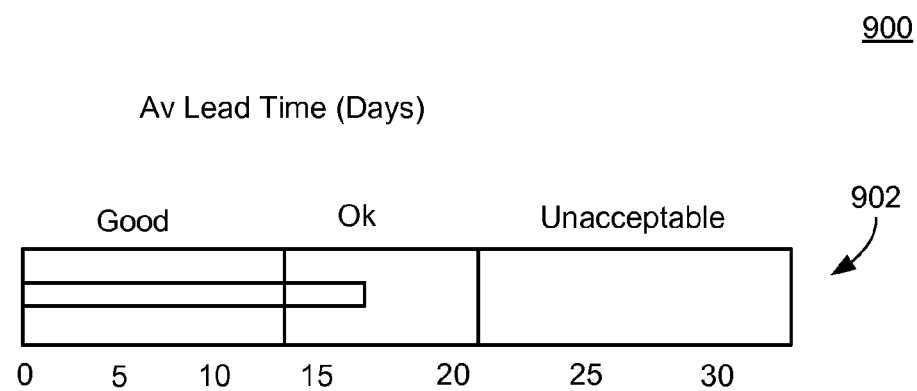
FIG. 8 is an example of an alert provided by the system of FIG. 1.
FIG. 9 represents a graph that may be used to evaluate the alert of FIG. 8.

By way of illustration, FIG. 8 illustrates an example graphical user interface 800 which may be provided by the supplier review module 126 to the customer 112. Specifically, as shown, the user interface 800 includes a column 802 for individual suppliers of the suppliers 106, a column 804 indicating a type of alert detected for the supplier of the column 802, as well as columns 806, 808 which include, respectively, a date of the alert and a description of the alert. Of course, it may be appreciated that various other additional or alternative columns may be included in the example user interface 800.

In the example of FIG. 8, the supplier column 802 identifies a specific company, company A. Meanwhile, the column 804 identifies an alert type related to a key performance indicator (KPI) of "delivery." Of course, although not specifically illustrated in FIG. 8, it may generally be appreciated that many other individual suppliers, associated alerts, and corresponding dates and descriptions could be included within the user interface 800.

Nonetheless, the simplified example of FIG. 8 illustrates an example manner in which the customer 112 may benefit from the information available within the supplier records 108. That is, as shown, the customer 112 may be provided with information regarding individual suppliers, where such information has been extracted from available information sources 104, and provided to the customer 112 in a convenient manner. For example, in situations where the customer 112 represents an individual responsible for monitoring the performance of the suppliers 106, the individual customer 112 may arrive at work and may immediately be provided with information such as that shown in FIG. 8, based on individual documents that the individual customer 112 may not otherwise have reviewed.

Thus, in the example, the individual customer 112 is immediately provided with an ability to identify and analyze operations of the identified supplier. In this way, for example, the individual customer 112 may determine a specific problem associated with the identified supplier, which may have affected, e.g., a timeliness of deliveries associated with that supplier. Then, for example, the individual customer 112 may immediately determine whether such problems may be temporary or more systematic, and they make an intelligent decision, for example, as to whether a substitute supplier should be used. Without the availability of such information, the individual customer 112 may not otherwise be aware of potential delivery problems, until, for example, an actual delivery is not delivered, or is delivered late. By such time, it may be substantially more difficult for the customer 112 to maintain the timeliness of a larger supply chain, and to otherwise maintain a consumer satisfaction level.

FIG. 9 is a second example user interface 900, illustrating the ability of the supplier review module 126 to provide the customer 112 with a benchmarking of an identified supplier against other ones of the suppliers 106. In the example of FIG. 9, a graph 902 illustrates an average lead time, in days of relevant or similar suppliers. As shown, the chart 902 illustrates a good, okay, and unacceptable range(s) of average lead time for deliveries. In the example, a bar 904, the average lead time for the company A of FIG. 8 is within the "okay" range, as compared to other relevant ones of the suppliers 106.

Of course, many other types of benchmarks may be selected for providing to the customer 112, e.g., in conjunction with a number of other known types of KPIs which may be used to classify alerts regarding individual suppliers. It may be appreciated that all such metrics and related factors may benefit from the techniques described above with respect to FIGS. 1-7. That is, as described, the customer 112 may be provided with such information and related metrics, in a manner that is fast, efficient, and accurate, and that relies on a minimum of involvement from the customer 112 or other users.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor; and
   a non-transitory computer-readable storage medium configured to store instructions executable by the at least one processor, the system further including
   a record generator configured to cause the at least one processor to receive a plurality of documents associated with a plurality of suppliers, the record generator including
      an event classifier configured to execute a supplier-independent, event-based classification of each document, to thereby obtain event-classified documents;
      a supplier query generator configured to query the plurality of documents to obtain potential supplier matches from the plurality of suppliers;
      a supplier match analyzer configured to analyze each potential supplier match of the potential supplier matches, to thereby obtain supplier matches; and
      a supplier relevance analyzer configured to relate, for each event-classified document, at least one supplier identified therein to at least one event of the event-classified document, to thereby obtain at lease one supplier-event relationship, and further wherein the supplier relevance analyzer is configured to execute the supplier-event relating using a relevance model derived using a relevance-classified training set and a relevance-related machine learning algorithm, including analyzing a manner and extent of inclusion of the at least one supplier and the at least one event within the event-classified document, individually and in relation to one another,
   wherein the record generator is further configured to cause the at least one processor to provide at least one supplier-specific data record, based on the at least one supplier event relationship, the at least one supplier-specific data record including the at least one supplier, the at least one event, and a characterization of the relevance of the at least one event to the at least one supplier obtained from the supplier-event relating, and
      further wherein the system includes a view generator configured to generate a graphical view of the at least one supplier with respect to at least one performance indicator, the at least one performance indicator having a value determined at least in part based on the characterization of the relevance.

2. The system of claim 1, wherein the event classifier is configured to execute the classification of each document using an event model derived using event-classified training documents and an event-related machine learning algorithm.

3. The system of claim 1, wherein the supplier match analyzer is configured to analyze each potential supplier match using a supplier match model derived using match-classified training matches and a match-related machine learning algorithm.

4. The system of claim 1, wherein the record generator comprises a document fitness analyzer configured to receive documents from a plurality of information sources, and further configured to filter the received documents to obtain the plurality of documents.

5. The system of claim 4, wherein the document fitness analyzer is configured to filter the received documents using a document fitness model derived using fitness-based training documents and a fitness-based machine learning algorithm.

6. The system of claim 1, wherein the view generator is further configured to generate an alert with respect to a performance of the selected supplier with respect to the at least one performance indicator.

7. The system of claim 1, wherein the event classifier, the supplier match analyzer, and the supplier relevance analyzer implement independent supervised machine learning algorithms to obtain, respectively, the event-classified documents, the supplier matches, and the supplier-event relationships.

8. A computer-implemented method for executing instructions stored on a computer readable storage medium, the method comprising:
   receiving a plurality of documents associated with a plurality of suppliers;
   executing a supplier-independent, event-based classification of each document, to thereby obtain event-classified documents;
   querying the plurality of documents to obtain potential supplier matches from the plurality of suppliers;
   analyzing each potential supplier match of the potential supplier matches, to thereby obtain supplier matches;
   relating, for each event-classified document, at least one supplier identified therein to at least one event of the event-classified document, to thereby obtain at lease one supplier-event relationship, including executing the supplier-event relating using a relevance model derived using a relevance-classified training set and a relevance-related machine learning algorithm, and analyzing a manner and extent of inclusion of the at least one supplier and the at least one event within the event-classified document, individually and in relation to one another;

providing at least one supplier-specific data record, based on the at least one supplier event relationship, the at least one supplier-specific data record including the at least one supplier, the at least one event, and a characterization of the relevance of the at least one event to the at least one supplier obtained from the supplier-event relating; and generating a graphical view of the at least one supplier with respect to at least one performance indicator, the at least one performance indicator having a value determined at least in part based on the characterization of the relevance.

9. The method of claim 8, wherein the executing the supplier-independent, event-based classification of each document includes executing the classification of each document using an event model derived using event-classified training documents and an event-related machine learning algorithm.

10. The method of claim 8, wherein the analyzing each potential supplier match of the potential supplier matches includes analyzing each potential supplier match using a supplier match model derived using match-classified training matches and a match-related machine learning algorithm.

11. A computer program product, the computer program product being tangibly embodied on a non-transitory computer-readable storage medium and comprising instructions that, when executed by at least one processor, are configured to:

receive a plurality of documents associated with a plurality of suppliers;

execute a supplier-independent, event-based classification of each document, to thereby obtain event-classified documents;

query the plurality of documents to obtain potential supplier matches from the plurality of suppliers;

analyze each potential supplier match of the potential supplier matches, to thereby obtain supplier matches;

relate, for each event-classified document, at least one supplier identified therein to at least one event of the event-classified document, to thereby obtain at lease one supplier-event relationship, including executing the supplier-event relating using a relevance model derived using a relevance-classified training set and a relevance-related machine learning algorithm, and analyzing a manner and extent of inclusion of the at least one supplier and the at least one event within the event-classified document, individually and in relation to one another;

provide at least one supplier-specific data record, based on the at least one supplier event relationship, the at least one supplier-specific data record including the at least one supplier, the at least one event, and a characterization of the relevance of the at least one event to the at least one supplier obtained from the supplier-event relating; and generate a graphical view of the at least one supplier with respect to at least one performance indicator, the at least one performance indicator having a value determined at least in part based on the characterization of the relevance.

12. The computer program product of claim 11, wherein the instructions, when executed, are configured to execute the supplier-independent, event-based classification of each document including executing the classification of each document using an event model derived using event-classified training documents and an event-related machine learning algorithm.

13. The computer program product of claim 11, wherein the instructions, when executed, are configured to analyze each potential supplier match of the potential supplier matches including analyzing each potential supplier match using a supplier match model derived using match-classified training matches and a match-related machine learning algorithm.

14. The computer program product of claim 11, wherein the instructions, when executed, are configured to receive documents from a plurality of information sources, and further configured to filter the received documents to obtain the plurality of documents.

15. The computer program product of claim 14, wherein the instructions, when executed, are configured to filter the received documents using a document fitness model derived using fitness-based training documents and a fitness-based machine learning algorithm.

* * * * *